United States Patent
White

(10) Patent No.: US 10,542,680 B1
(45) Date of Patent: Jan. 28, 2020

(54) COVER FOR LARGE BALES OF HAY

(71) Applicant: Rick White, Dewey, OK (US)

(72) Inventor: Rick White, Dewey, OK (US)

( * ) Notice: Subject to any disclaimer, the term of this patent is extended or adjusted under 35 U.S.C. 154(b) by 16 days.

(21) Appl. No.: 15/860,696

(22) Filed: Jan. 3, 2018

Related U.S. Application Data

(60) Provisional application No. 62/441,685, filed on Jan. 3, 2017.

(51) Int. Cl.
| | |
|---|---|
| *A01F 25/13* | (2006.01) |
| *G09F 23/00* | (2006.01) |
| *B65D 25/24* | (2006.01) |
| *B65D 21/02* | (2006.01) |
| *B65D 43/02* | (2006.01) |

(52) U.S. Cl.
CPC .......... *A01F 25/13* (2013.01); *B65D 21/0215* (2013.01); *B65D 25/24* (2013.01); *B65D 43/02* (2013.01); *G09F 23/00* (2013.01); *B65D 2203/02* (2013.01); *G09F 2023/0025* (2013.01)

(58) Field of Classification Search
CPC ...... A01F 15/0715; A01F 25/13; A01F 25/10; A01F 25/16; A01F 15/071; A01F 2015/0745; B65D 85/66
USPC .......... 220/628; 206/83.5, 597, 417; 52/3, 4, 52/745.06
See application file for complete search history.

(56) References Cited

U.S. PATENT DOCUMENTS

| | | | | |
|---|---|---|---|---|
| 84,453 | A | * | 11/1868 | Whitney ................... E04H 9/14 52/4 |
| 637,159 | A | * | 11/1899 | Samuel .................... A01F 25/16 52/3 |
| 644,242 | A | * | 2/1900 | Combs .................... A01F 25/16 52/3 |
| 821,862 | A | | 5/1906 | Depew |
| 1,095,484 | A | * | 5/1914 | Wright ..................... E04H 9/14 52/4 |
| 2,635,562 | A | | 4/1953 | Abramson |
| 2,905,114 | A | * | 9/1959 | Olson ...................... A01F 25/10 206/585 |
| 3,659,641 | A | | 5/1972 | Marino |
| 3,674,073 | A | * | 7/1972 | Hendon ................. B65D 65/08 248/97 |
| 3,797,650 | A | | 3/1974 | O'Brien et al. |
| 3,857,210 | A | | 12/1974 | Austin |
| 4,041,654 | A | | 8/1977 | Nedila |
| 4,132,257 | A | * | 1/1979 | Filosa .................... B65D 19/38 220/650 |
| 4,221,085 | A | | 9/1980 | Conaghan |
| 4,248,343 | A | | 2/1981 | Schaefer |
| 4,521,997 | A | * | 6/1985 | Tiberend ................. A01F 25/13 160/218 |
| 4,538,385 | A | | 9/1985 | Kandarian |
| 4,712,672 | A | | 12/1987 | Roy et al. |
| 4,794,717 | A | * | 1/1989 | Horsmann .......... A01M 31/025 135/901 |
| 4,826,015 | A | * | 5/1989 | Mandel ................... B65D 85/66 206/303 |

(Continued)

*Primary Examiner* — Gideon R Weinerth
(74) *Attorney, Agent, or Firm* — Margaret Millikin

(57) ABSTRACT

The present invention is a reusable, free standing cover for holding a large bale of hay. The cover can be round or square in cross section to accommodate round or square bales and is provided externally with feet to enable the cover to hold the bale of hay above the ground and to enable stacking of bales of hay.

11 Claims, 2 Drawing Sheets

(56) References Cited

U.S. PATENT DOCUMENTS

| | | | | |
|---|---|---|---|---|
| 4,891,918 | A * | 1/1990 | Wiley | B65D 85/62 |
| | | | | 150/154 |
| 4,891,930 | A * | 1/1990 | Schaefer | A01F 15/071 |
| | | | | 414/24.6 |
| 4,907,380 | A | 3/1990 | Jannin | |
| 4,912,886 | A | 4/1990 | Jannin | |
| 5,515,977 | A * | 5/1996 | Lambert | B65D 19/44 |
| | | | | 206/395 |
| 5,669,183 | A * | 9/1997 | Frentress | A01F 25/13 |
| | | | | 206/83.5 |
| 5,671,551 | A * | 9/1997 | Adam | A01F 25/13 |
| | | | | 34/201 |
| 5,709,064 | A * | 1/1998 | Swartz | A01F 25/13 |
| | | | | 206/83.5 |
| 7,117,879 | B1 * | 10/2006 | Massey | E04H 15/38 |
| | | | | 135/132 |
| 9,339,008 | B1 * | 5/2016 | Getz | A01K 5/01 |
| 2008/0110403 | A1 * | 5/2008 | Lerner | A01K 5/01 |
| | | | | 119/58 |
| 2010/0236113 | A1 * | 9/2010 | McNally | G09F 1/08 |
| | | | | 40/538 |
| 2012/0114450 | A1 * | 5/2012 | Hennig | A01D 87/127 |
| | | | | 414/24.5 |
| 2013/0032046 | A1 * | 2/2013 | Ohm | A01F 15/0715 |
| | | | | 100/40 |
| 2017/0359960 | A1 * | 12/2017 | Reijersen van Buuren | |
| | | | | A01F 15/0715 |

* cited by examiner

COVER FOR LARGE BALES OF HAY

CROSS-REFERENCE TO RELATED APPLICATIONS

This application claims priority to U.S. provisional application Ser. No. 62/441,685, entitled COVER FOR LARGE BALES OF HAY filed Jan. 3, 2017, the entirety of which is incorporated herein by reference.

BACKGROUND OF THE INVENTION

Field of the Invention

The present invention relates to a reusable, free standing cover for holding a large bale of hay. The cover can be round or square in cross section to accommodate round or square bales and is provided externally with feet to enable the cover to hold the bale of hay above the ground and to enable stacking of bales of hay.

Description of the Related Art

Large bales of hay often must remain in the field until they are consumed by livestock. Without being protected from the weather, bales absorb moisture and the outside portion of the bale deteriorates.

The outside 4 inches of a 6 foot diameter round bale contains about 20 percent of the total hay in the bale. Thus 4 inches of spoilage on a 6 foot bale weighting 1,500 pounds amounts to a loss of 300 pounds of hay. At $80 per ton for good hay, that loss amounts to $12 of hay per bale due to weather related spoilage.

In addition to the loss of hay on the outside of the bale, as much as 12 inches of the bottom of a bale can be lost through moisture absorption resulting from the wicking action when a bale of hay is in contact with damp ground.

In the presence of moisture, bacteria and fungus attack the hay, eating up the most easily digestible nutrients in the hay. When the bleaching effects of the sun are added to the nutrient destruction caused by microorganisms, bales of hay that are left in the field unprotected can have their nutrient value decreased by about a third of their original value. Only the innermost portion of the exposed bale remains nutritious, and the livestock are forced to eat moldy hay to get to that innermost portion of the bale.

Eating this moldy hay has detrimental effects on the health and growth of livestock. Growth of beef herds is slowed, and milk production in dairy herds is reduced. Also, reproduction problems in the livestock may develop.

For these reasons, it is desirable to store bales of hay so that they are protected from the effects of weather. Farmers generally do not have sufficient barn space in which to store large bales of hay and thus they are forced to store their hay outside.

Various plastic sheet toppers or slip on sacks have been developed to cover or partially cover bales to protect them from the weather. These plastic sheet toppers or sacks are generally not reusable and they present a disposal problem after they have been removed from the bales.

Also, because they are constructed of plastic sheeting material, they may become damaged or blow off the bales, reducing the protection they provide to the hay. If a hole is torn or poked in the sheeting material, rain can enter the enclosure and is trapped within the enclosure. This results in rapid souring and rotting of the bale. Most large bales are lifted and transported using a stinger that inserts into the bale. Use of a stinger will puncture a plastic sheeting device, creating holes in the device where moisture can enter the bale.

Another problem with these types of plastic sheeting devices is that they can be too airtight which can result in the hay rotting. Also, they can cause "green" bales to overheat and catch on fire.

A further problem with large bales of hay, particularly round bales, is that they are difficult to stack when it is necessary to store them in limited space.

The present invention addresses these problems by providing a reusable, free-standing cover for a bale of hay. The cover is slightly larger than the bale that will be inserted into it. The cover is either round or square in cross-sectional configuration to accommodate either round or square bales of hay.

The cover is open on one end so that a bale of hay can be inserted into the cover via the open end. The open end can be provided with a removable lid designed to cover the open end. The lid preferably with have a central spear hole where a stinger can be inserted and with heat holes near its top to allow heat and moisture to escape from the bale.

The cover is provided on its opposite end with a central spear hole where a stinger can insert and with heat holes near its top to allow heat and moisture to escape from the bale. The bottom of the cover is provided with drip holes that allow water to drain out of the cover. Externally, the bottom of the cover is provided with feet that serve to hold the bale and the cover above the ground and that also facilitate stacking of bales of hay.

SUMMARY OF THE INVENTION

The present invention is a reusable, free standing cover for holding a large bale of hay. The cover is slightly larger than the bale that will be inserted into it. The cover is either round or square in cross-sectional configuration to accommodate either round or square bales of hay.

The cover is open on one end so that a bale of hay can be inserted into the cover via the open end. The open end can be provided with a removable lid designed to cover the open end. The lid preferably is provided with a central spear hole where a stinger can be inserted and with heat holes near the top of the cover to allow heat and moisture to escape from the bale.

The cover is provided on its opposite end with a central spear hole where a stinger can insert and with heat holes near the top of the cover to allow heat and moisture to escape from the bale of hay.

The bottom of the cover is provided with drip holes that allow water to drain out of the cover. Externally, the bottom of the cover is provided with feet that serve to hold the bale and the cover above the ground. The feet also facilitate stacking of bales of hay.

Additionally, the sides of the cover can be used to display advertising, promotional information, slogans or images, school pride, favorite ball team, etc.

DETAILED DESCRIPTION OF THE PREFERRED EMBODIMENT

Figure 1:
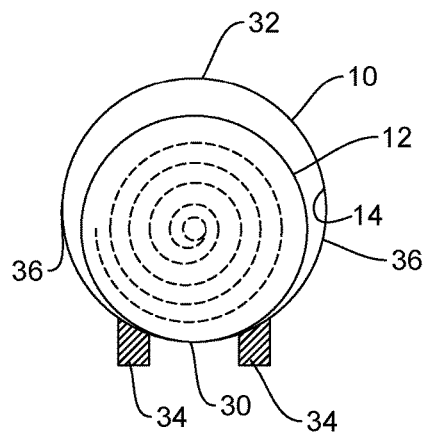
FIG. 1 is a front plan view of a round cover for large round hay bales that is constructed in accordance with a preferred embodiment of the present invention.

Referring now to the drawings and initially to FIGS. 1-5, there is illustrated a round cover 10 for a large round bale of hay 12 that is constructed in accordance with a preferred embodiment of the present invention. FIGS. 6-10 illustrate an alternate embodiment square cover 10A that is for use with a large square bale of hay. The covers 10 and 10A are reusable and free standing. Each cover 10 and 10A is slightly larger than the bale of hay 12 and 12A that will be inserted into it. The cover 10 illustrated in FIGS. 1-5 is round in cross-sectional configuration to accommodate a round bale of hay 12, and the alternate cover 10A illustrated in FIGS. 6-10 is square in cross-sectional configuration to accommodate a square bale of hay 12A.

The covers 10 and 10A may be constructed of plastic, metal, galvanized material or any other suitable material that is weather resistant and free standing.

Figure 6:
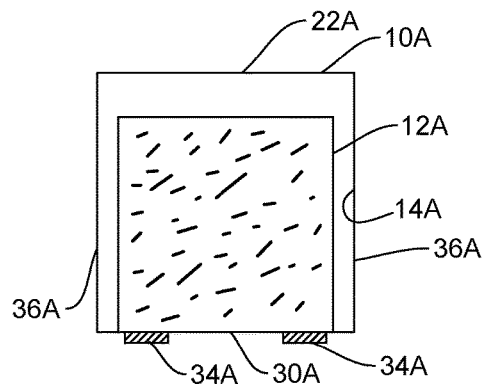
FIG. 6 is a front plan view of a square cover for large square hay bales that is constructed in accordance with an alternate embodiment of the present invention.

Referring to FIGS. 1 and 6, the covers 10 and 10A are open on their front ends 14 and 14A so that a bale of hay 12 and 12A can be inserted into each cover 10 and 10A via its open end 14 and 14A.

Figure 2:
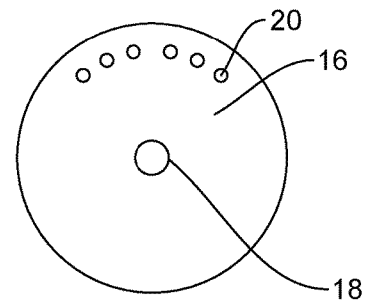
FIG. 2 is a plan view of a lid for covering the open front end of the cover of FIG. 1.
Figure 7:
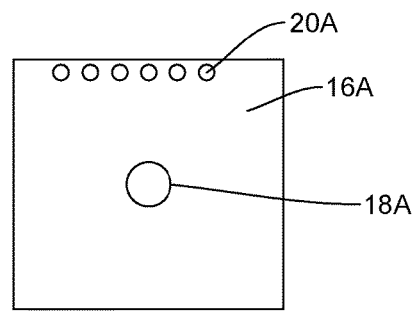
FIG. 7 is a plan view of a lid for covering the open front end of the cover of FIG. 6.

As illustrated in FIGS. 2 and 7, each of the open ends 14 and 14A can be provided with a removable lid 16 and 16A designed to cover the open end 14 and 14A. The lids 16 and 16A preferably are provided with a central spear hole 18 and 18A where a stinger can be inserted to lift the bale 12 and 12A and with heat holes 20 and 20A near the top 22 and 22A of the cover 10 and 10A to allow heat and moisture to escape from the bale 12 and 12A.

Figure 3:
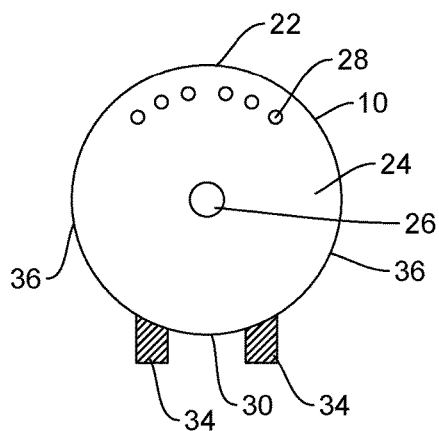
FIG. 3 is a rear plan view of the cover of FIG. 1.
Figure 8:
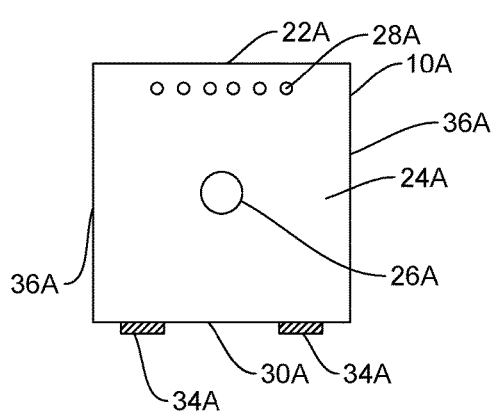
FIG. 8 is a rear plan view of the cover of FIG. 6.

Referring now to FIGS. 3 and 8, each cover 12 and 12A is provided on its opposite rear end 24 and 24A with a central spear hole 26 and 26A where a stinger can insert to lift the bale 12 and 12A and with heat holes 28 and 28A near the top 22 and 22A of the cover 10 and 10A to allow heat and moisture to escape from the bale of hay 12 and 12A.

Optionally, although not illustrated, the covers 10 and 10A can be made to be open also on their rear ends 24 and 24A and provided with removable lids 16 and 16A, as previously described for open ends 14 and 14A.

Figure 4:
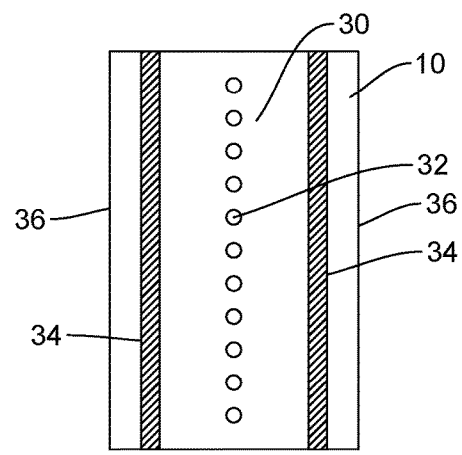
FIG. 4 is a bottom plan view of the cover of FIG. 1.
Figure 9:
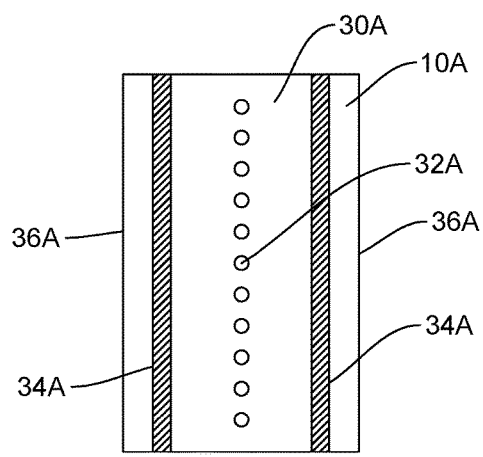
FIG. 9 is a bottom plan view of the cover of FIG. 6.

As illustrated in FIGS. 4 and 9, a bottom 30 and 30A of each cover 10 and 10A is provided with drip holes 32 and 32A that allow water to drain out of the cover 10 and 10A. Externally, the bottom 30 and 30A of each cover 10 and 10A is provided with feet 34 and 34A that serve to hold the bale 12 and 12A and the cover 10 and 10A above the ground. The feet 34 and 34A also facilitate stacking of bales of hay 12 and 12A.

Figure 5:
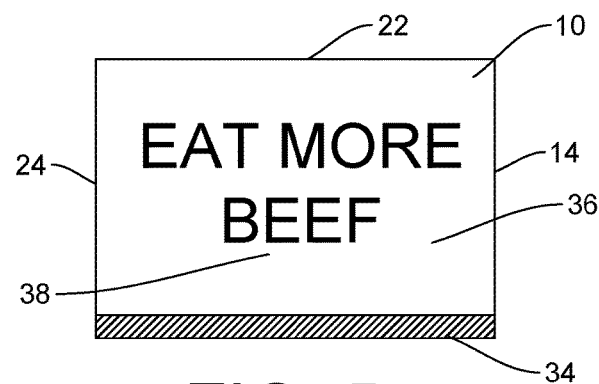
FIG. 5 is a side view of the cover of FIG. 1.
Figure 10:
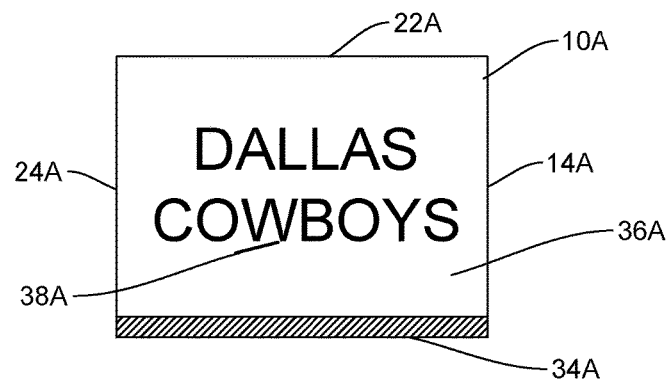
FIG. 10 is a side view of the cover of FIG. 6

Referring to FIGS. 5 and 10, sides 36 and 36A of the covers 10 and 10A can be used to display advertising, promotional information, slogans or images, school pride, favorite ball team, etc. 38 and 38A.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

I claim:

1. A reusable, free standing cover for encapsulating a bale of hay, the cover comprising:
    a horizontal body, wherein the body forms:
        an open front end positioned substantially vertically with respect to the horizontal body and through which the bale of hay may be inserted into the cover;
        a closed rear end positioned substantially vertically with respect to the horizontal body and opposite the open front end, the closed rear end forming a spear hole for accessing and lifting the bale of hay inside the cover;
        a bottom side forming drip holes adapted to drain fluids and condensate from the cover;
    a removable lid receivable on the open front end of the cover, the removeable lid comprising a spear hole for accessing and lifting the bale of hay inside the cover and a plurality of holes adapted to release heat within the bale or the cover, wherein the plurality of holes are formed proximate a top periphery of the removable lid to permit the release of heat; and
    a support foot attached to the bottom side of the body.

2. The cover of claim 1 wherein the cover is made from a free standing material.

3. The cover of claim 2 wherein the cover is made from a material selected from the group consisting of metal, plastic or galvanized steel and combinations thereof.

4. The cover of claim 1 wherein the shape of the cover is round.

5. The cover of claim 1 wherein the shape of the cover is square.

6. The cover of claim 1 wherein the closed rear end is closeable and comprises an open rear end through which the bale of hay may be inserted into the cover and a removable lid receivable on the rear end.

7. The cover of claim 6 wherein the removeable lid receivable on the rear end forms a spear hole for accessing and lifting the bale of hay inside the cover and a plurality of holes proximate a top periphery of the removable lid on the rear end.

8. The cover of claim 1 wherein the support foot elevates the cover above a substrate.

9. The cover of claim 1 wherein the support foot enables multiple covers to be stacked.

10. The cover of claim 1 further comprising signage.

11. The cover of claim 1 wherein the closed rear end, positioned substantially vertically with respect to the horizontal body and opposite the open front end, further forms a plurality of holes adapted to release heat within the bale or the cover, wherein the plurality of holes are formed proximate a top periphery of the removable lid to permit the release of heat.

* * * * *